United States Patent [19]
Kaye

[11] Patent Number: 5,400,954
[45] Date of Patent: Mar. 28, 1995

[54] REVERSIBLE-RETURNABLE ENVELOPE BLANK

[75] Inventor: Howard B. Kaye, Syracuse, N.Y.

[73] Assignee: PCI Paper Conversions, Inc., Syracuse, N.Y.

[21] Appl. No.: 33,532

[22] Filed: Mar. 18, 1993

[51] Int. Cl.⁶ ............... B65D 27/06; B65D 27/16
[52] U.S. Cl. ................... 229/75; 229/306; 229/80.5
[58] Field of Search ........... 229/301, 302, 306, 75, 229/300, 80.5

[56] References Cited

U.S. PATENT DOCUMENTS

| | | | |
|---|---|---|---|
| 895,520 | 8/1908 | Virkus | 229/306 |
| 2,332,751 | 10/1943 | Powell | 229/306 |
| 2,588,950 | 3/1952 | Woolsey | 229/306 |
| 2,829,818 | 4/1958 | Alsop | 229/306 |
| 4,210,250 | 7/1980 | Yale | 229/306 X |
| 4,669,652 | 6/1987 | Seguin | 229/306 X |
| 4,715,531 | 12/1987 | Stewart et al. | 229/306 |
| 4,917,287 | 4/1990 | Watson | 229/306 |

FOREIGN PATENT DOCUMENTS

| | | | |
|---|---|---|---|
| 2063884 | 9/1992 | Canada | 229/306 |
| 24723 | 8/1906 | United Kingdom | 229/306 |
| 114805 | 4/1918 | United Kingdom | 229/306 |
| 119551 | 10/1918 | United Kingdom | 229/306 |
| 2193702 | 2/1988 | United Kingdom | 229/306 |

*Primary Examiner*—Sue A. Weaver
*Attorney, Agent, or Firm*—Charles J. Brown

[57] ABSTRACT

A reversible and returnable envelope blank of generally cross-shape wherein opposed flaps have non-permanent reusable releasable low-tack pressure-sensitive adhesive at selected places thereon to allow the blank to be folded securely into an envelope by the sender with no adhesive exposed and after unfolding by the receiver reversed and refolded securely into a new envelope still with no adhesive exposed.

2 Claims, 5 Drawing Sheets

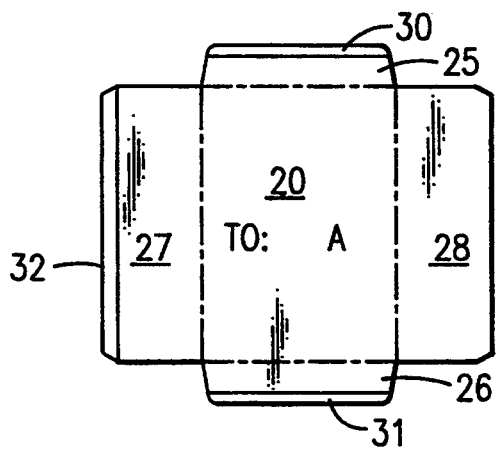
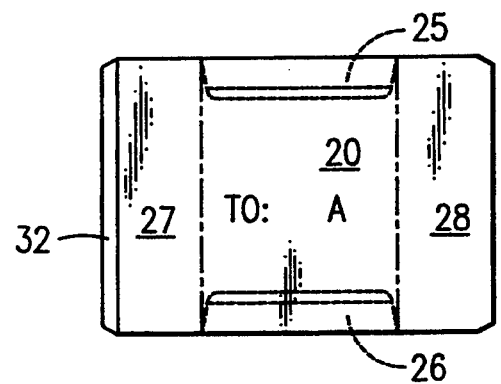
FIG.3A  FIG.3B
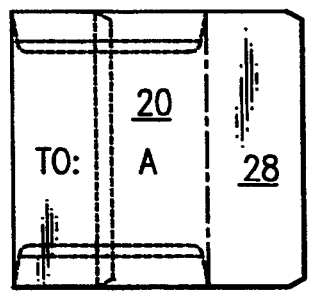
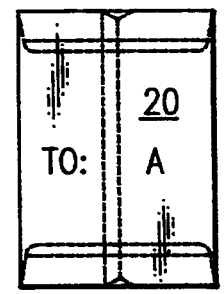
FIG.3C  FIG.3D 5,400,954

REVERSIBLE-RETURNABLE ENVELOPE BLANK

BACKGROUND OF THE INVENTION

Reversible and returnable envelope blanks are known wherein tabs or flaps are folded in one way to form an envelope sent by the sender to the receiver and then re-folded in another way to form a return envelope for re-mailing back to the sender. For example, U.S. Pat. No. 4,210,250 describes a generally cross-shaped envelope blank having a sending side and a returning side and two pairs of opposed flaps extending from a central panel. There are a total of five deposits of adhesive on various of the flaps, two of which are of an always-sticky gum-type releasable adhesive which once used and separated losed its adhesive properties, and three of which are of a moisture-activatable adhesive which become sticky only when moistened and which after drying forms a permanent bond. Such moisture-activatable adhesives have the disadvantage of being susceptible to unintentional activation from exposure to water or humidity. Also, release paper is typically used on the gum-type releasable pressure sensitive adhesives. Moreover, following the correct procedure in folding the flaps of this prior art blank together at the first mailing and then again upon re-mailing is by no means uncomplicated and if it is not done properly the first time the envelope must be discarded because none of the adhesive deposits can be used twice.

Other returnable envelopes disclosed in the prior art include that of U.S. Pat. No. 2,829,818 which involves stapling parts of the blank together when it is readied for re-mailing. Some prior art reversible envelope designs include tear strips such as those disclosed in U.S. Pat. Nos. 4,669,652 and 4,917,287.

It is a principal object of the present invention to provide a blank for forming a reversible and returnable envelope which avoids the use of staples and tear strips, avoids moisture-activated adhesive susceptible to unintended activation and avoids the use of release paper usually required for pressure-sensitive adhesives. A further object is to permit the envelope to be folded and re-folded such that if the folding is done mistakenly the flaps can be peeled apart and done again correctly, which is not possible with adhesives which can only be used once. The invention further includes among its purposes an economical use of both paper and adhesive, avoidance of the danger of tearing of the sheet material of the blank and avoidance of exposure of any adhesive not in use during sending or returning.

SUMMARY OF THE INVENTION

In accordance with the invention a blank is provided for forming a reversible and returnable envelope. The blank comprises a generally cross-shaped sheet having a sending side and a returning side. The sheet includes a central panel having first and second opposed edges and third and fourth opposed edges. First and second opposed flaps extend foldably from the respective first and second edges of the central panel and third and fourth opposed flaps extending foldably from the respective third and fourth edges of the central panel, these third and fourth flaps being sized to at least partially overlap one another when folded back against the central panel.

A deposit of non-permanent reuseable releasable low-tack pressure-sensitive adhesive is located in one of six arrangements on the flaps. The adhesive may be on the sending side of the first, second and third flaps and the returning side of the first and second flaps. It may be on the sending side of the third flap and the returning side of the first, second and third flaps. It may be on the sending side of the first, second and third flaps and the returning side of the first and second flaps. It may be on the sending side of the third flap and the returning side of the fourth flap. It may be on the returning side of the first, second and third flaps. Finally, it may be on the sending side of the third flap and the returning side of the first and second flaps.

In a sending mode all of the flaps are folded toward the returning side of the central panel and are releasably secured together by the adhesive deposits with no adhesive exposed and in a returning mode all of the flaps are folded toward the sending side of the central panel and are releasably secured together by the adhesive deposits with no adhesive exposed. In a preferred form of the invention the adhesive deposits are bands along the outer edge portions of the respective flaps.

BRIEF DESCRIPTION OF THE DRAWINGS

FIG. 3-A is a plan view of the sending side of the blank of FIG. 2 showing the first of the selected locations on that sending side of the adhesive deposits, namely on the first, second and third flaps;

FIG. 3-B is a view of the blank of FIG. 2 showing the first and second flaps folded back in the first folding step which takes place in the sending mode;

FIG. 3-C shows the blank of FIG. 2 with the third flap folded back in the next folding step of the sending mode;

FIG. 3-D shows the blank of FIG. 2 with the fourth flap folded in place to complete the envelope in the sending mode;

FIG. 4-B shows the blank of FIG. 2 with the first and second flaps folded back in the first folding step of the returning mode;

FIG. 4-C shows the blank of FIG. 2 with the fourth flap folded back in the next folding step of the returning mode;

FIG. 4-D shows the blank of FIG. 2 with the third flap folded back to complete the envelope in the returning mode;

DESCRIPTION OF PREFERRED EMBODIMENT

Figure 1:
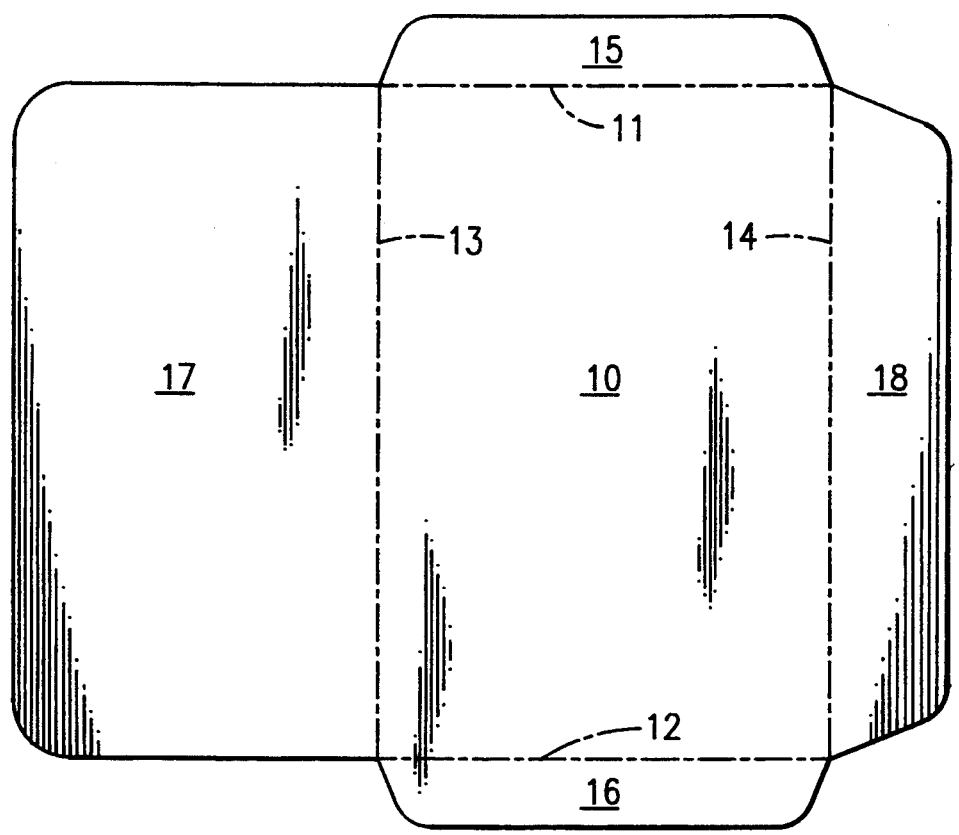
FIG. 1 is a plan view of one form of generally cross-shaped sheet comprising the blank of the invention.

Turning first to FIG. 1 one form of the blank of the invention is a generally cross-shaped sheet which includes a rectangular central panel 10 having first and second opposed edges 11 and 12 and third and fourth opposed edges 13 and 14. A first flap 15 extends foldably from the first edge 11 of the central panel 10 and the second flap 16 extends foldably from the second edge 12 of the central panel 10. A relatively large third flap 17 extends from the third edge 13 of the central panel 10 and it is opposed to a fourth flap 18 which extends foldably from the fourth edge 14 of the central panel 10. The third and fourth flaps 17 and 18 are sized so that they partially overlap at their outer edges when folded back against the central panel 10.

Figure 2:
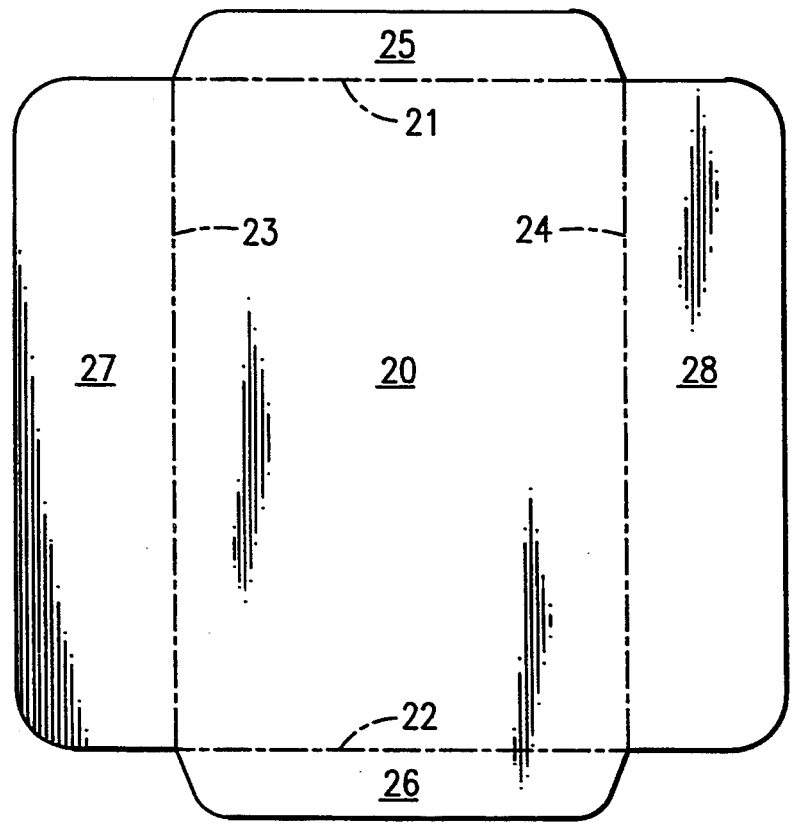
FIG. 2 is another form of a generally cross-shaped sheet forming the blank of the invention.
Figure 4A:
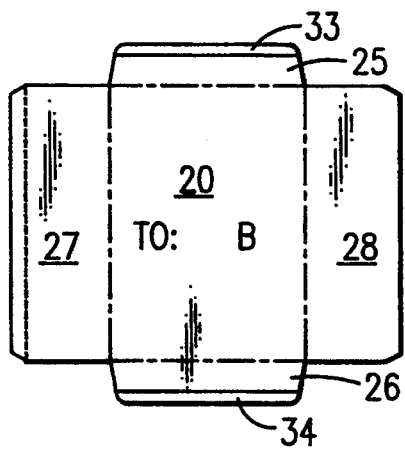
FIG. 4-A is a plan view of the receiving side of the blank of FIG. 2 showing the first of the selected locations on that receiving side of the with adhesive deposits, namely on the first and second flaps.
Figure 4B:
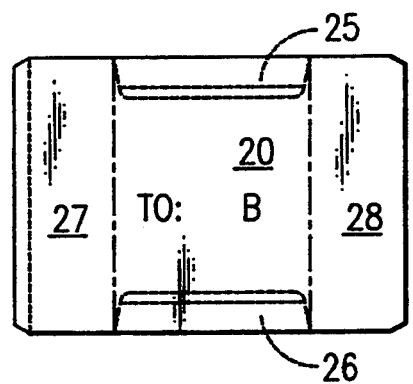
Figure 4C:
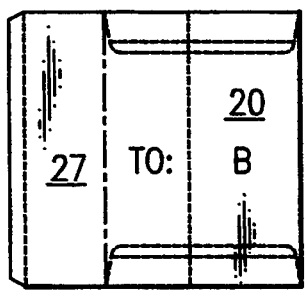
Figure 4D:
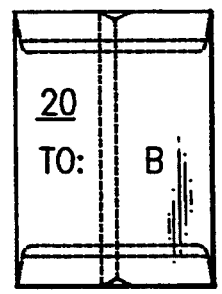

An alternative configuration for the blank of the invention is illustrated in FIG. 2 and differs from that of FIG. 1 in that the opposed pairs of flaps are of more equal size. The blank of FIG. 2 includes a central panel 20 with opposed edges 21 and 22 and opposed edges 23 and 24. First and second opposed flaps 25 and 26 extend foldably from the respective first and second edges 21 and 22 of the central panel 20. Third and fourth opposed flaps 27 and 28 extend foldably from the respective third and fourth edges 23 and 24 of the central panel 20 and again are sized to partially overlap at their outer edges when folded back against the central panel.

The expressions "sending" side or mode and "returning" side or mode are used herein arbitrarily only to contrast one with the other. Therefore they may be reversed so that everything described here in relation to "sending" is applicable to "returning" and vise versa. It will also be understood that the sheet of which the blanks of FIGS. 1 or 2 or any other alternate cross-shaped configuration are formed are typically of paper but may be of other flexible sheet-like material such as plastic.

As described below, deposits of non-permanent re-useable releasable low-tack pressure-sensitive adhesive are located in bands in selected places on the outer edges of the flaps of the blank. An example is an acrylic polymer microsphere structured adhesive. They are placed in one of six selected sets of locations as mentioned previously. The selection of those locations will now be described in relation to the form of the blank shown in FIG. 2.

Referring now to FIGS. 3-A to 3-D the sending side of the blank of FIG. 2 is shown in successive stages of folding of its flaps in the sending mode. In this embodiment the adhesive is applied as shown in FIG. 3-A to the sending side in bands 30 and 31 on the outer edges of the first and second flaps 25 and 26 and in a band 32 on the outer edge of the third flap 27. As shown in FIG. 4-A the adhesives is applied to the returning side in bands 33 and 34 on the outer edges of the first and second flaps 25 and 26.

The first folding step in configuring the blank into a envelope in the sending mode is shown in FIG. 3-B where the first and second flaps 25 and 26 are folded backwardly against the receiving side of the central panel 20 and adhered thereto by the adhesive bands 2.3 and 34. The next folding step is shown in FIG. 3-C where the third flap 27 is folded backwardly against the receiving side of the panel 20 to be adhered thereto by approximately half of each of the bands 30 and 31. The final folding step in the sending mode is shown in FIG. 3-D where the fourth flap 28 is folded rearwardly against the receiving side of the panel 20 to be adhered not only by the remaining halves of the bands 30 and 31 but also by the full length of the band 32 on the third flap 27 which is overlapped by the outer edge of the fourth panel 28.

No adhesive is exposed when the sending mode folding is complete. The expression "TO: A" on the sending side of the panel 20 in FIGS. 3-A to 3-D indicates where the address of the receiver may be appropriately placed with a postage stamp adjacent thereto. When the envelope in the sending mode arrives at the address of the receiver it may be opened simply by reversing the steps described above in relation to FIGS. 3-A to 3-D.

The first folding step carried out by the receiver in preparing to send the envelope back to the sender in the receiving mode is illustrated in FIG. 4-B, which is to fold the first and second flaps 25 and 26 rearwardly against the sending side of the panel 20 to be adhered thereto by the adhesive deposits 30 and 31. The next folding step is shown in FIG. 4-C, namely the folding of the fourth flap 28 rearwardly against the sending side of the panel 20 to be adhered in place by approximately half of each of the adhesive bands 33 and 34. The final folding step in the returning mode shown in FIG. 4-D is to fold the third flap 27 rearwardly against the sending side of the panel 20 to be adhered by the remainder of each of the adhesive bands 33 and 34. Again, no adhesive is exposed at this point. Upon arrival the sender can re-open the envelope simply by reversing the steps of FIGS. 4-A to 4-D.

It will be noted that the sender may enter a written communication (whether by filling in blanks or by text) on the returning side of the third and fourth flaps 27 and 28 shown in FIG. 4-A and it will be concealed when the sender completes the sending mode folding as shown in FIG. 3-D so as to be confidential during transit. Likewise the receiver may enter a written communication on the sending side of the third and fourth flaps 27 and. 28 shown in FIG. 3-A and it too will be concealed when the envelope is fully folded in the returning mode as shown in FIG. 4-D.

It will be apparent that the deposits of adhesive on the various flaps may be located differently from the embodiment of FIGS. 3-A. to 3-D and FIGS. 4-A to 4-D and still achieve the same result.

Figure 5A:
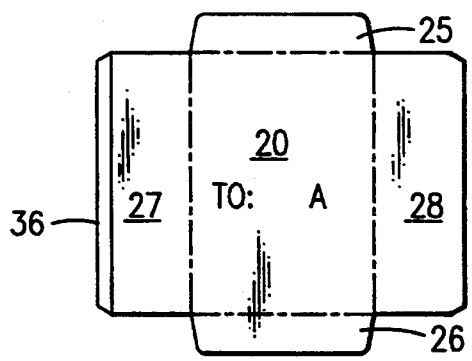
FIGS. 5-A and 5-B show the sending and returning sides respectively of the FIG. 2 blank with the next of the selected locations for the deposit of the non-permanent releasable adhesive.
Figure 5B:
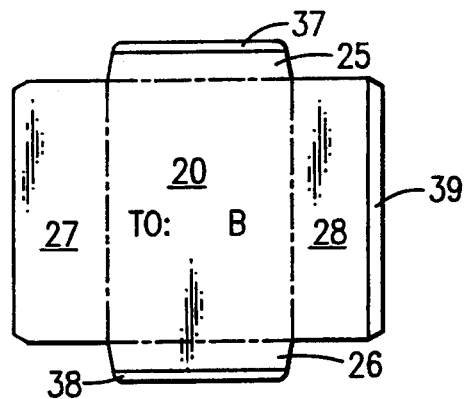

Referring to FIGS. 5-A and 5-B an adhesive-to-adhesive form is shown where the flaps are held down by four deposits of adhesive. Here an adhesive band 36 is located on the outer edge of the sending side of the third flap 27. On the returning side shown in FIG, 5-B adhesive bands 37 and 38 are located on the outer edges of the first and second flaps 25 and 26 and another adhesive band 39 is located on the outer edge of the fourth flap 28. The folding steps in the sending mode are first to fold the first and second flaps 25 and 26 so that the adhesive bands 37 and 38 adhere against receiving side of the panel 20, then to fold the third flap 27 rearwardly against the panel 20 and finally to fold the fourth flap 28 rearwardly against the receiving side of the panel 20 so that the band 39 on its outer edge overlaps and is secured in adhesive-to-adhesive contact by the adhesive band 36. Referring to FIG. 5-B, in the returning mode the first and second flaps 25 and 26 are first folded rearwardly against the sending side of the panel 20, next the fourth flap 28 is folded rearwardly against the sending side of the panel 20 to be held in place by approximately half the length of the adhesive bands 37 and 38 and finally the third flap 27 is folded rearwardly against the sending side of the panel 20 to be secured by the remainder of the adhesive bands 37 and 38 and the full adhesive-to-adhesive overlapping lengths of the adhesive bands 36 and 39. No adhesive is exposed in either the sending or receiving mode.

Figure 6A:
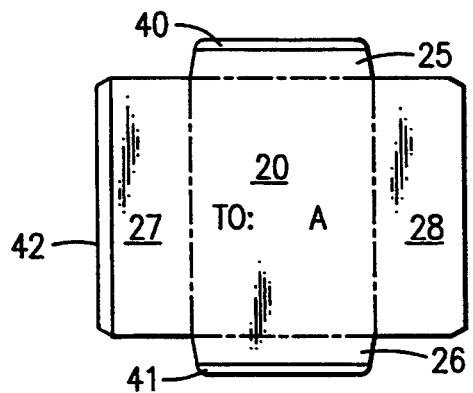
FIGS. 6-A and 6-B show the next selected location for the adhesive deposits on the sending and returning sides respectively of the FIG. 2 blank.
Figure 6B:
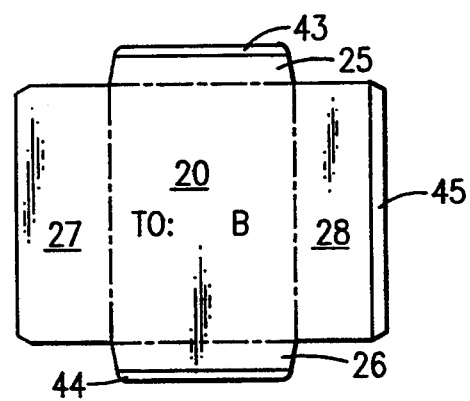

Referring to FIGS. 6-A and 6-B adhesive bands 40 and 41 are located on the outer edge of the sending side of the first and second flaps 25 and 26 and another adhesive band 42 is located on the outer edge of the third flap 27. On the returning side shown in FIG. 6-B adhesive bands 43 and 44 are located on the outer edges of the first and second flaps 25 and 26 and another adhesive band 45 is located on the outer edge of the fourth flap 28. The folding steps in the sending mode are first to fold the first and second flaps 25 and 26 rearwardly so that the adhesive bands 43 and 44 adhere against the receiving side of the panel 20, then to fold the third flap 27 rearwardly against the panel 20 and finally to fold the fourth flap 28 rearwardly against the receiving side of the panel 20 so that the band 45 on its outer edge overlaps and is secured in adhesive-to-adhesive contact by the adhesive band 42. Referring to FIG. 6-B, in the returning mode the first and second flaps 25 and 26 are first folded rearwardly against the sending side of the panel 20 to be adhered in place by the adhesive bands 40 and 41, next the fourth flap 28 is folded rearwardly against the sending side of the panel 20 to be held in place by approximately half the length of the adhesive bands 43 and 44 and finally the third flap 27 is folded rearwardly against the sending side of the panel 20 to be secured by the remainder of the adhesive bands 43 and 44 and the full adhesive-to-adhesive overlapping lengths of the adhesive bands 42 and 45. No adhesive is exposed in either the sending or receiving mode.

Figure 7A:
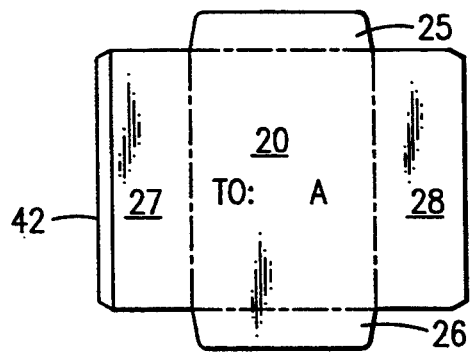
FIGS. 7-A and 7-B show another variation in the selected locations of adhesive deposits on the FIG. 2 blank on its sending and returning sides respectively.
Figure 7B:
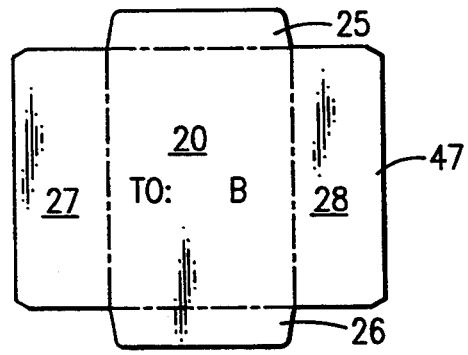

Referring now to FIG. 7-A an adhesive band 46 is located on the outer edge of the sending side of the third flap 27. On the returning side shown in FIG. 7-B an adhesive band 47 is located on the outer edge of the fourth flap 28. The folding steps in the sending mode are first to fold the first and second flaps 25 and 26 rearwardly against the receiving side of the panel 20, then to fold the third flap 27 rearwardly against the receiving side of the panel 20 and finally to fold the fourth flap 28 rearwardly against the receiving side of the panel 20 so that the band 47 on its outer edge overlaps and is secured in adhesive-to-adhesive contact with the adhesive band 46. The first and second flaps 25 and 26 held mechanically in place beneath. Referring to FIG. 7-B in the returning mode the first and second flaps 25 and 26 are first folded rearwardly against the sending side of the panel 20, next the fourth flap 28 is folded rearwardly against the sending side of the panel 20 and finally the third flap 27 is folded rearwardly against the sending side of the panel 20 to be secured by the full adhesive-to-adhesive overlapping lengths of the adhesive panels 46 and 47 with the first and second flaps 25 and 26 held mechanically therebeneath. No adhesive is exposed in either the sending or receiving mode.

Figure 8A:
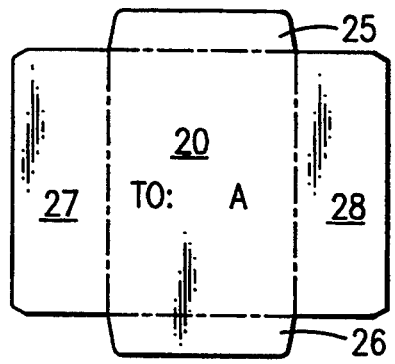
FIGS. 8-A and 8-B show yet another variation in the location of those adhesive deposits the FIG. 2 blank on its sending and returning sides respectively.
Figure 8B:
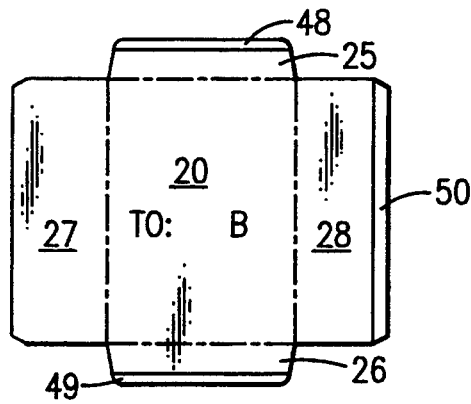

Referring to FIGS. 8-A and 8-B there is no adhesive deposit on the sending side shown in FIG. 8-A but on the returning side shown in FIG. 8-B adhesive bands 48 and 49 are located on the outer edges of the first and second flaps 25 and 26 and another adhesive band 50 is located on the outer edge of the fourth flap 28. The folding steps in the sending mode are first to fold the first and second flaps 25 and 26 rearwardly so that the adhesive bands 48 and 49 adhere against the receiving side of the panel 20, then to fold the third flap 27 against the receiving side of the panel 20 and finally to fold the fourth flap 28 rearwardly against the receiving side of the panel 20 so that the band 50 on the returning side of its outer edge overlaps and secures the outer edge of the third flap 27. Alternatively, the folding steps in the sending mode may be first to fold the third flap 27 against the receiving side of the panel 20, then to fold the fourth flap 28 rearwardly such that it overlaps the third flap 27 and secures the flap 27 with the band 50 of adhesive. Then the first and second flaps 25 and 26 are folded rearwardly against the receiving side of the panel 20 such that the bands of adhesive 48 and 49 respectively hold these flaps secure to the already folded flaps 27 and 28. Referring to FIG. 8-B, in the returning mode the first and second flaps 25 and 26 are first folded rearwardly against the sending side of the panel 20, next the fourth flap 213 is folded rearwardly of the sending side of the panel 20 to be held in place by approximately half the length of the adhesive bands 48 and 49 and finally the third flap 27 is folded rearwardly against the sending side of the panel 20 to be secured by the remainder of the adhesive bands 48 and 49 and the full length of the adhesive band 50. No adhesive is exposed in either the sending or receiving mode.

Figure 9A:
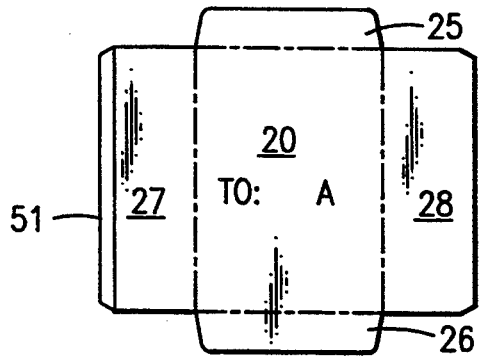
FIGS. 9-A and 9-B show still another variation in the location of those adhesive deposits on the respective sending and returning sides of the FIG. 2 blank.
Figure 9B:
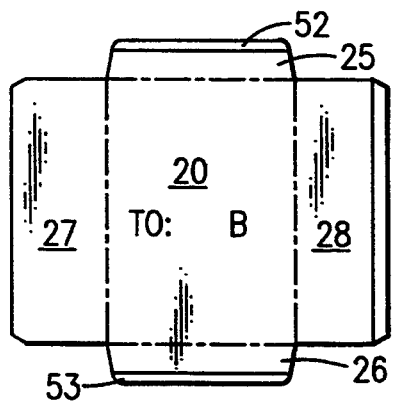

Referring to FIGS. 9-A and 9-B an adhesive band 51 is located on the outer edge of the sending side of the third flap 27. On the returning side shown in FIG. 9-B adhesive bands 52 and 53 are located on the outer edges of the first and second laps 25 and 26. The folding steps in the sending mode are first to fold the first and second flaps 25 and 26 rearwardly so that the adhesive bands 52 and 53 adhere against the receiving side of the panel 20, then to fold the third flap 27 rearwardly against the receiving side of the panel 20 and finally to fold the fourth flap 28 rearwardly against the receiving side of the panel 20 so that its outer edge overlaps and is secured by the adhesive band 51. Alternatively, the folding steps in the sending mode may be first to fold the third flap 27 rearwardly against the receiving side of the panel 20, then folding the fourth flap 28 rearwardly against the panel 20 to be secured by the adhesive band 51 on the sending side of the third flap 27, and finally to fold the first and second flaps rearwardly to the receiving side of the panel 20 so that they are secured by their respective adhesive bands 52 and 53 on the receiving side thereof. Referring to FIG. 9-B in the returning mode the first and second flaps 25 and 26 are first folded rearwardly against the sending side of the panel, 20 next the fourth flap 28 is folded rearwardly against the sending side of the panel 20 to be held in place by approximately half the length of the adhesive bands 52 and 53 and finally the third flap 27 is folded rearwardly against the sending side of the panel 20 to be secured by the remainder of the adhesive bands 52 and 53 and the full length of the adhesive band 51.

It is to be understood that the scope of the invention is to be determined not by the foregoing description of preferred embodiments but rather by the following claims.

I claim:

1. A blank for forming a reversible and returnable envelope comprising
   a) a generally cross-shaped sheet having a sending side and a returning side and comprising
      i. a central panel having first and second opposed edges and third and fourth opposed edges, ii. first and second opposed flaps extending foldably from the respective first and second edges of the central panel, and iii. third and fourth opposed flaps extending foldably from the respective third and fourth edges of the central panel and being sized to partially overlap when folded back against the central panel; and b) a deposit of non-permanent releasable adhesive on only the sending side of the first, second and third flaps and the returning side of the first and second flaps;

c) whereby in a sending mode the first and second flaps and then the third and fourth flaps are folded toward the returning side of the central panel and are releasably secured together by said adhesive deposits with no adhesive exposed and in a returning mode the first and second flaps and then the fourth and third flaps are folded toward the sending side of the central panel and are releasably secured together by said adhesive deposits with no adhesive exposed.

2. A blank according to claim 1 wherein the adhesive deposits are bands along outer edge portions of the respective flaps.

* * * * *